US011845659B2

United States Patent
Bellosta Von Colbe et al.

(10) Patent No.: US 11,845,659 B2
(45) Date of Patent: Dec. 19, 2023

(54) INTEGRATED MATERIAL AND PROCESS FOR INTEGRATED OPERATION OF A HYDRIDE STORAGE SYSTEM

(71) Applicants: Helmholtz-Zentrum hereon GmbH, Geesthacht (DE); Stühff GmbH, Geesthacht (DE)

(72) Inventors: José M. Bellosta Von Colbe, Wentorf (DE); Thomas Klassen, Wentorf (DE); Martin Dornheim, Reppenstedt (DE); Julian Jepsen, Hamburg (DE); Klaus Horst Taube, Hamburg (DE); Giovanni Capurso, Geesthacht (DE); Holger Stühff, Geesthacht (DE)

(73) Assignees: Helmholtz-Zentrum hereon GmbH, Geesthacht (DE); Stühff GmbH, Geesthacht (DE)

( * ) Notice: Subject to any disclaimer, the term of this patent is extended or adjusted under 35 U.S.C. 154(b) by 202 days.

(21) Appl. No.: 17/364,211

(22) Filed: Jun. 30, 2021

(65) Prior Publication Data
US 2022/0002150 A1 Jan. 6, 2022
US 2022/0340417 A9 Oct. 27, 2022

(30) Foreign Application Priority Data
Jul. 1, 2020 (EP) ..................................... 20183448

(51) Int. Cl.
C01B 3/00 (2006.01)
C09K 5/06 (2006.01)
F17C 11/00 (2006.01)
H01M 8/065 (2016.01)

(52) U.S. Cl.
CPC .......... *C01B 3/0078* (2013.01); *C01B 3/0036* (2013.01); *C09K 5/063* (2013.01); *F17C 11/005* (2013.01); *H01M 8/065* (2013.01); *F17C 2221/012* (2013.01); *F17C 2270/0763* (2013.01)

(58) Field of Classification Search
CPC ... C01B 3/0026; C01B 3/0036; C01B 3/0078; C09K 5/063; F17C 11/005; F17C 2221/012; F17C 2270/0763; H01M 8/04216; H01M 8/065; Y02E 60/32; Y02E 60/50; Y02P 20/10
See application file for complete search history.

(56) References Cited

U.S. PATENT DOCUMENTS

| 4,566,281 A * | 1/1986 | Sandrock .............. C01B 3/0031 165/47 |
| 5,497,630 A | 3/1996 | Stein et al. |
| 2010/0266488 A1 | 10/2010 | De Rango et al. |
| 2012/0061397 A1 | 3/2012 | Fruchart et al. |

OTHER PUBLICATIONS

Oelerich et al. . "Metal Oxides as Catalysts for Improved Hydrogen Sorption in Nanocrystalline Mg-based Materials", Journal of Alloys and Compounds, vol. 135:237-242 (2001 ).
Jehan et al., "McPhy-Energy's Proposal for Solid State Hydrogen Storage Materials and Systems", Journal of Alloys and Compounds 580:S343-S348 (2013).
Pielichowska et al., "Phase Changing Materials for Thermal Energy Storage", *Progress in Materials and Science*, vol. 65:67-123 (2014).
Farid et al., "A Review on Phase Change Energy Storage: Materials and Applications", *Energy Conversion and Management*, vol. 45:1597-1615 (2004).
Sundarram et al., "The Effect of Pore Size and Porosity on Thermal Management Performance of Phase Change Material Infiltrated in Microcellular Metal Foams", *Applied Thermal Engineering*, vol. 64:147-154 (2014).
Sakintuna et al., "Metal Hydride Materials for Solid Hydrogen Storage: a Review", *International Journal of Hydrogen Energy*, vol. 32: 1121-1140 (2007).
Kumar et al., "Hydrogen Absorption/Desorption Characteristics of Room Temperature ZrMn2?xNix system (X=1.25-1.50)", Bull. Mater. Sci., vol. 37:655-660 (2014).
Mellouli et al., "Integration of Thermal Energy Storage Unit in a Metal Hydride Hydrogen Storage tank", *Applied Thermal Engineering*, Pergamon, Oxford, GB, vol. 102:1185-1196 Apr. 12, 2016 (Apr. 12, 2016).
Torab H. et al., "High Temperature Thermal Energy Storage for Space Power Systems", *American Society of Mechanical Engineers, Advanced Energy Systems Division (Publication) AES, American Soc of Mechanical Engineers (ASME)*, vol. 5:71-77, Jan. 1, 1988 (Jan. 1, 1988).
European Application No. 20183448.8, European Search Report, dated Nov. 13, 2020.

\* cited by examiner

*Primary Examiner* — Victoria H Lynch
(74) *Attorney, Agent, or Firm* — MARSHALL, GERSTEIN & BORUN LLP

(57) ABSTRACT

The present invention relates to a composite material for hydrogen storage based on metal hydrides and to a method of operating a hydrogen storage system based on metal hydrides capable of releasing and absorbing hydrogen. Such hydrogen storage systems based on metal hydrides may be applicable as a fuel source for a fuel cell. The composite material for hydrogen storage comprises a powder or pellets of a hydride and a phase changing material (PCM), wherein the PCM is an encapsulated phase changing material (EPCM) which is homogeneously dispersed within the powder or pellets of the hydride.

14 Claims, No Drawings

INTEGRATED MATERIAL AND PROCESS FOR INTEGRATED OPERATION OF A HYDRIDE STORAGE SYSTEM

CROSS-REFERENCE TO RELATED APPLICATION

The present application claims priority to European Patent Application No. 20183448.8, filed Jul. 1, 2020, which is hereby incorporated herein by reference.

FIELD OF THE INVENTION

The present invention relates to a composite material for hydrogen storage based on metal hydrides and to a method of operating a hydrogen storage system based on metal hydrides capable of releasing and absorbing hydrogen. Such hydrogen storage systems based on metal hydrides may be applicable as a fuel source for a fuel cell.

BACKGROUND OF THE INVENTION

Hydrogen is used in numerous industrial fields, for example as fuel in fuel cells or heat engines, as a reagent, for example for hydrogenation reactions, or as a source for storing energy, for example in batteries.

The discussion around future ecologically and economically promising energy economy has for some years been increasingly concentrated on efficient solutions also for generating energy. The developments are taking place in various technical sectors, for example in the field of industrial or domestic combined heat and power or in the automotive sector, in each case with the aim of obtaining an increase in efficiency of the overall process.

In the field of power generation, the potential of fuel cell technology has been recognized for some years and efforts are being made to obtain and use power and heat therefrom effectively. Fuel cells are galvanic cells which convert the chemical reaction energy of a continuously supplied fuel and an oxidant with simultaneous generation of heat into electrical energy. Often hydrogen is used as a fuel and oxygen as an oxidizing agent.

Hydrogen storage is a key enabling technology for the development of a hydrogen and fuel cell based economy. Hydrogen has the highest energy density per unit mass of any fuel; however, its low volumetric density at ambient temperature and pressures correspondingly results in a rather low energy density per unit volume. The most common hydrogen storage still consists of compressing the hydrogen gas at a pressure between about 35 MPa and 75 MPa which is connected with many disadvantages. The tanks are costly and their structure was found to age poorly. Moreover, improvements in that technology are marginal due to the inherent limitation of the compressed hydrogen density. Another storage mode consists in liquefying the hydrogen in cryogenic tanks at very low temperature. Also these tanks are costly as they must be well insulated.

In recent years, hydrogen storage in the form of metal hydride has been investigated as an advantageous alternative, allowing for safer storage conditions and limited energy expenditure. Hydride storage systems, in particular metal hydride storage systems, have proved to be particularly suitable for storing the fuel. Solid state hydrogen storage, e.g. via Mg $H_2$, gives very good performances in terms of volumetric density. Metal hydride storage systems function at very low operating pressures. This makes the storage system safe and compact. Storing fuels, such as hydrogen, in metal hydrides allows a storage which is virtually loss-free over a long period of time without additional energy expenditure, as the gas is chemically bound. For safety as well, metal hydride storage systems are more suitable than compressed gas or liquid hydrogen storage systems, as the hydrogen cannot escape explosively.

Metal hydride materials research focuses on improving both the volumetric and gravimetric capacities, hydrogen absorption/desorption kinetics, and reaction thermodynamics of potential material candidates. Furthermore, long-term cycling effects have to be taken into account for the development of hydrogen-based technologies. Transition metal based additives have been used to improve the kinetics of hydrogen absorption/desorption, as e.g. disclosed in W. Oelerich, T. Klassen, R. Bormann "*Metal oxides as catalysts for improved hydrogen sorption in nanocrystalline Mg-based materials*", Journal of Alloys and Compounds, Vol. 135, 2001, pages 237-242.

Other approaches in improving both the hydrogen absorption/desorption kinetics and reaction thermodynamics of metal hydrides focus on thermal management of the heat transfer during desorption and absorption of hydrogen. One of the reasons for this is that the dehydrogenation, i.e. the release of hydrogen from the hydride, is an endothermic reaction, where heat is needed, and the hydrogenation, i.e. the absorption of hydrogen in the hydride storage, is an exothermic reaction, where heat is created. In some reactions, such as in case of magnesium hydride ($\Delta H$~-75 kJ/mol), a considerable effort in thermal management needs to be exerted so that desorption/absorption reactions take place at interesting reaction rates.

U.S.-Pub. 2010/0266488 A1 proposes a hydrogen storage material based on magnesium hydride and graphite, preferably expanded natural graphite (ENG), in compacted form which allegedly has good properties in terms of mechanical strength and thermal conductivity, leading to good absorption and desorption kinetics.

M. Jehan, D. Furchart "*McPhy-Energy's proposal for solid state hydrogen storage materials and systems*", Journal of Alloys and Compounds 580 (2013), pages S343 to S348, proposes using in addition to expanded natural graphite (ENG) as a heat transfer agent, an in tank heat storage by filling a co-axis tube with a phase changing material (PCM) to manage the high amount of heat in the Mg/$MgH_2$ reaction. The PCM melts during hydrogenation, thus storing energy as latent heat in the melt. During desorption of hydrogen, the PCM solidifies giving away the heat energy to the hydride so that it can decompose and liberate the hydrogen.

U.S.-Pub. 2012/006397 A1 discloses an adiabatic hydrogen storage tank based on metal hydrides comprising a hydride vessel and tubular containers which incorporate a phase changing material (PCM).

However, heat transfer between the hydride vessel and the PCM has proven not to be very effective leading to heat transfer problems, especially at a later stage of the reaction when the PCM is more than halfway melted or solidified, respectively. For this reason and because of the additional weight and volume involved, the proposed solutions did not find good acceptance in the market. Another problem is the complexity of the system, as the use of PCMs requires the construction of a separate vessel, piping, etc.

SUMMARY OF THE INVENTION

It is an object of the present invention to provide a composite material for hydrogen storage based on hydrides which effectively manages the heat created during hydrogen absorption and consumed during hydrogen desorption in hydrides, and a system for hydrogen storage based on hydrides which is less complex and costly than known systems.

The object is achieved with a composition having the features set out in claim 1. Preferred embodiments are described in the dependent claims.

According to an aspect of the present invention, there is provided a composite material comprising a powder or pellets of a metal hydride and a phase changing material (PCM), wherein the PCM is an encapsulated phase changing material (EPCM) which is homogeneously dispersed within the powder or pellets of the hydride. In another embodiment of the invention, the encapsulated phase changing material (EPCM) is a microencapsulated phase changing material (MEPCM).

Encapsulated Phase Changing Material

Encapsulated phase changing materials (EPCMs) are described in K. Pielichowska, K. Pielichowski "*Phase changing materials for thermal energy storage*", Progress in Materials and Science 65 (2014), pages 67 to 123, and M. Farid, A. Khudhair, S. Razak, S. Al-Hallaj "*A review on phase change energy storage: materials and applications*", Energy Conversion and Management, Vol. 45 (2004), pages 1597 to 1615), which documents are fully incorporated herein for reference. Encapsulated phase changing materials (EPCMs) may be described as particles that contain a phase changing material (PCM) surrounded by a shell or a coating or as that are embedded in a particulate matrix in such manner that PCM stays embedded in the particles of the matrix upon melting. Such PCM materials are available under the Rubitherm® RT series or Rubitherm® SP series trade names from Rubitherm Technologies GmbH, Germany in a wide variety of melting temperatures ranging from −10° C. to 90° C. Suitable PCM materials include, but are not limited to Rubitherm® RT100, Rubitherm® RT100HC, Rubitherm® RT90HC, Rubitherm® RT80HC, Rubitherm® RT82, Rubitherm® RT70HC, Rubitherm® RT69HC, Rubitherm® RT65, Rubitherm® RT64HC, Rubitherm® RT62HC, Rubitherm® RT60, Rubitherm® RT55, Rubitherm® RT54HC, Rubitherm® RT50, Rubitherm® RT47, Rubitherm® RT44HC, Rubitherm® RT42, Rubitherm® RT35HC, Rubitherm® RT31, Rubitherm® RT28HC, Rubitherm® RT24, Rubitherm® RT22HC, Rubitherm® RT21 HC, Rubitherm® RT21, Rubitherm® RT18HC, Rubitherm® RT15, Rubitherm® RT12, Rubitherm® RT11HC, Rubitherm® RT10HC, Rubitherm® RT10, Rubitherm® RT9, Rubitherm® RT8HC, Rubitherm® RT8, Rubitherm® RT5HC, Rubitherm® RT5, Rubitherm® RT4, Rubitherm® RT3HC, Rubitherm® RT2HC, Rubitherm® RT0, Rubitherm® RT-4, Rubitherm® RT-9HC; Rubitherm® SP90, Rubitherm® SP70, Rubitherm® SP58, Rubitherm® SP50, Rubitherm® SP31, Rubitherm® SP29EU, Rubitherm® SP26E, Rubitherm® SP25E2, Rubitherm® SP24E, Rubitherm® SP21 EK, Rubitherm® SP15, Rubitherm® SP-11, Rubitherm® SP-17.

Different encapsulation techniques may be applied to prepare capsules, in particular microcapsules, with a polymer or metal cover and a PCM core. The methods employed for preparing capsules with a polymer cover and a PCM core involve complex coacervation, suspension, emulsion, condensation, polyaddition polymerization, or spray coating. Metal covers may be placed around the PCM materials or even around the polymer encapsulated PCM material.

Other suitable encapsulated PCM materials are available from Croda under the tradename Crodalherm™ ME29P from Croda International PLC, United Kingdom; under the trade name savE® FS29 from Pluss Advanced Technologies Pvt. Ltd, India and Puretemp® 151, Puretemp® 108, Puretemp® 68 from Puretemp LLC, U.S.A.

Generally, the PCM particles have a diameter in the range of from 1 μm to 5 mm, preferably 1 μm to 1 mm. Microencapsulated phase changing materials (MEPCMs) are described as particles that contain core material surrounded by a coating or shell or embedded in particles of a matrix, the particles having diameters in the range of about 1 μm to less than 1000 μm preferably of about 10 μm to about 20 μm.

In an alternative embodiment, the encapsulated phase changing material is contained in the pores of a particulate porous or structured sponge-like matrix material. This kind of material is also often referred-to as PCM composite materials or shape-stabilized PCMs (ss-PCM). Such EPCM particles are available under the trade name Rubitherm® PX15, Rubitherm® PX25, Rubitherm® PX52, Rubitherm® PX82, Rubitherm® GR42 and Rubitherm® GR82 from Rubitherm Technologies GmbH, Germany. Thus, the term encapsulated phase changing material (EPCM) is also intended to include PCM materials embedded in a particulate matrix material for the purposes of the present invention.

The particles wherein the phase changing material is contained in the pores of a particulate porous or structured sponge-like matrix material generally also have a diameter in the range of from 1 μm to 5 mm, preferably 1 μm to 1 mm. However, pore size of the pores or channels where the PCM material is contained becomes more decisive. Generally, the pore size of such material is in the range of from 25 nm to 250 μm, preferably from 1 μm to 150 μm, and more preferably from 25 μm to 100 μm. See S. Sundarram et al. "*The effect of pore size and porosity on thermal management performance of phase change material infiltrated in microcellular metal foams*", Applied Thermal Engineering, Vol. 64, 2014, pages 147-154.

The heat generated during hydrogen absorption of the hydrogen storage material is stored in the phase changing material and subsequently used to supply heat to the hydride material when the hydrogen is to be desorbed from the metal hydride. Thus, the heat generated by the absorption of the hydrogen is stored in the phase changing material when it changes from a first to a second phase. Subsequently, during use, the heat stored is released when the phase changing material changes from the second to the first phase. In an embodiment of the invention, the phase changing material (PCM) is selected to change from the solid phase to the liquid phase and vice versa. This serves to ensure high heat conduction while not requiring the construction of a separate vessel, piping, etc. for the PCM material.

In another embodiment of the invention, the phase changing material (PCM) is selected so as to have a melting area $\Delta T_f$, as determined by DSC, between the hydrogen desorption temperature ($T_1$) at the operating desorption pressure and the hydrogen absorption temperature ($T_2$) at the operating absorption pressure of the selected metal hydride. To avoid favouring one reaction direction over the other in terms of loading or unloading time, the peak $T_f$ of the melting area $\Delta T_f$, as determined by DSC, of the PCM should be as close as possible to $(T_1+T_2)/2$. The same should apply to the data regarding the congealing area and the peak of the congealing area, also determined via DSC, which are preferably as close as possible to those of the melting area.

Metal Hydrides

Metal hydrides used as hydrogen storage materials are divided into different categories depending on their desorption temperature. An overview of common metal hydrides and their properties can be found in B. Sakintuna et al. "*Metal hydride materials for solid hydrogen storage: A review*", International Journal of Hydrogen Energy, Vol. 32 (2007), 1121-1140, which is fully incorporated for reference herein.

The relationship between pressure, temperature and hydrogen concentration in the metal during hydrogen absorption is determined as a pressure-composition-temperature (PCT) isotherms over a range of temperature. Hydrogen is dissolved in the metal lattice at a certain temperature while increasing the pressure. This process obeys Sieverts' law until a saturation concentration is reached (α-phase). Then the concentration in the metal increases without pressure increase; the hydride phase (β-phase) is formed; that is, hydrogen starts to react with the metal to form the metal hydride and α-phase and β-phase coexist in the alloy. This "plateau area" obeys both van't Hoff's law and Gibbs's phase rule. At the end of the plateau, the pressure rises again and hydrogen atoms is dissolved in the hydride phase according to Sieverts' law. The van't Hoff equation is given by:

$$ln P_{eq} = -\frac{\Delta H}{RT} + \frac{\Delta S}{R}$$

where $P_{eq}$ is the equilibrium plateau pressure, R the gas constant and T the reaction temperature.

To compare different hydrides, it has become common to construct van't Hoff diagrams based on the equilibrium values in the PCT diagrams in the middle of the plateau at different temperatures. By plotting 1/T vs. ln($P_{eq}$) both the enthalpy of absorption ($\Delta H_{abs}$) and the entropy values can be calculated. The enthalpy of reaction for the hydrogen absorption reaction ($\Delta H_{abs}$) is calculated from the slope of the straight line in the diagram 1/T vs. ln($P_{eq}$). (See V. Kumar et al. "*Hydrogen absorption/desorption characteristics of room temperature $ZrMn_{2-x}Ni_x$ system (X=1.25-1.50)*", Bull. Mater. Sci. Vol. 37, 2014, pages 655-660.) In the same manner, the enthalpy of reaction for the hydrogen desorption reaction ($\Delta H_{des}$) is be calculated from the slope of the straight line obtained from pressure-composition-temperature (PCT) curves of the hydrogen desorption reaction.

With the category of medium-temperature hydrides, desorption begins at a normal pressure of 100 kPa between 100° C. and 200° C. Medium-temperature hydrides are defined by an absolute value (modulus) of the reaction enthalpy ($\Delta H_{abs}$) for the hydrogen absorption reaction between 30 kJ/mol $H_2$ and 65 kJ/mol $H_2$. As a rule, they have a storage density for hydrogen of approximately 2.5% by weight to 5% by weight based on the metal. The medium-temperature hydrides include aluminum hydrides such as $NaAlH_4$ and amides such as $LiNH_2$ having an $H_2$ absorption capacity of up to 4.5% by weight. The optimal hydrogen absorption temperature ($T_1$) is e.g. for sodium aluminum hydride at approx. 125° C. and the hydrogen desorption temperature ($T_2$) at approx. 160 to 185° C. Medium-temperature hydrides are interesting candidates for mobile applications due to their relatively high hydrogen storage capacity and relatively low operating temperatures.

In the case of high-temperature hydrides, desorption begins at a normal pressure of 100 kPa above 200° C. They are defined by an absolute value (modulus) of the reaction enthalpy ($|\Delta H_{abs}|$) for the hydrogen absorption reaction of more than 65 kJ/mol $H_2$. As a rule, they have an even higher storage density for hydrogen of approx. 7% by weight to 15% by weight based on the underlying metal or compound. Often formed from light metals (magnesium, aluminum) and/or non-metals (nitrogen, boron), they might be suitable for use in fuel cells and $H_2$ internal combustion engines due to their high capacities. In the case of magnesium hydride the optimal hydrogen desorption temperature ($T_1$) lies at approx. 300° C. and optimal hydrogen desorption temperature ($T_2$) between 340° C. and 400° C.

Low-temperature hydrides with a desorption temperature at a normal pressure of 100 kPa between −40° C. and below 100° C. are, due to their relatively low weight-related storage capacity for hydrogen of less than 2 wt.-%, only very specifically useful for mobile applications, especially for prototypes of forklifts and bicycles where a small storage capacity can be accepted. They are defined by an absolute value (modulus) of the reaction enthalpy ($|\Delta H_{abs}|$) for the hydrogen absorption reaction of less than 30 kJ/mol $H_2$.

The powder or the granules of the metal hydride can have any suitable size. For example, the granules can have an average diameter of about 1 μm or greater, such as between 1 μm and 50 mm, preferably 1 μm to 1000 μm, more preferably 10 μm to 1000 μm.

DETAILED DESCRIPTION OF THE INVENTION

As stated, in an embodiment of the invention, the phase changing material (PCM) is selected so as to have a melting area $\Delta T_f$ as determined by differential scanning calorimetry (DSC), between the hydrogen desorption temperature ($T_1$) at the operating desorption pressure and the hydrogen absorption temperature ($T_2$) at the operating absorption pressure of the selected metal hydride. Also the shell material shall be selected to withstand the required temperatures and the contact with hydrogen without harm.

In general, the pressure for the hydrogen desorption is preferably selected to be between 10 kPa and 2,000 kPa, and the pressure for the hydrogen absorption, the charging pressure, is preferably selected to be between 150 kPa and 10,000 or even 30,000 kPa or 70,000 kPa, depending on the hydride.

While PCM encapsulated with a polymer might be useful for being dispersed within a powder or pellets of a medium-temperature hydride or of a low-temperature hydride, it is preferred that PCM encapsulated with a metal is dispersed within a powder or pellets of a high-temperature hydride, so as to avoid degradation of the shell.

The minimum amount of phase changing material may be selected by dividing the energy stored in the hydride's chemical bonds by the latent heat of melting, $\Delta H_m$ (PCM), of the PCM material. The total energy, $E_{tot}$ (HYD), that is stored in a hydride's chemical bonds is determined by multiplying the enthalpy of the absorption reaction, $\Delta H_r$ (HYD), of the hydride with the stored mass of hydrogen, $m_{HYD}$, in the hydride, where the stored mass of hydrogen in the hydride is the product of its capacity and the total mass of the hydride.

$$m_{PCM} = \frac{E_{tot}\ (HYD)}{\Delta H_m(PCM)} = \frac{\Delta H_r(hyd) \cdot m_{HYD}}{\Delta H_m(PCM)}$$

As an example, the minimum amount of Crodalherm™ 53, a PCM melting at about 53° C. and having a latent heat of melting, $\Delta H_m(PCM)$, of 226 kJ/kg, in Hydralloy® C5, $Ti_{0.95}Zr_{0.05}Mn_{1.46}V_{0.45}Fe_{0.09}$, a hydride storage material having a $\Delta H_r=25$ kJ/mol $H_2$, and a capacity of 1.5 wt % (this means that for each 100 kg of storage material, 1.5 kg of $H_2$ can be stored) can be calculated by first determining the stored energy (E) in 100 kg of the hydride (disregarding any heat losses) as follows:

$$E = \frac{1500\ g}{2\ g/mol} \cdot 25 = 18750\ kJ$$

On the basis of stored energy (E) in 100 kg of the hydride, then the minimum amount of PCM for each 100 kg of hydride can be calculated by dividing the energy by the heat capacity of the PCM:

$$m_{PCM} = \frac{18750}{226} = 82.97\ kg\ of\ PCM$$

Therefore, for every 100 kg of Hydralloy® C5, at least 82.97 kg of active CrodaTherm™ 53 PCM material are required. This calculation is provided as an illustrative example only. It has to be borne in mind that CrodaTherm™ 53 is not an encapsulated phase changing material, however according to the invention it will have to be provided as such. The encapsulation or matrix embedding will add some weight (although scarcely any volume at all) to this calculation.

In an embodiment of the invention, the metal hydride and the encapsulated phase changing material may be in the form of a compacted material. The term compacted material as used below means a material whose density is significantly higher than that of the raw materials in the powder state. This material is obtained in particular by compressing a mixture of raw materials in powder or granular form, either with or without the addition of a compacting agent, thus reducing the porosity.

In still another embodiment, the composite material comprising a powder or pellets of a hydride and a phase changing material (PCM) may further contain a heat transfer enhancement agent incorporated therein. Such heat transfer enhancement agent may be chosen, e.g. from graphite such as expanded natural graphite (ENG) and other known materials.

In still another embodiment, the composite material is incorporated in a hydrogen storage tank which is preferably coupled to a fuel cell.

In a still further embodiment, the present invention relates to a method of operating a hydrogen storage system based on metal hydrides capable of releasing and absorbing hydrogen wherein a composite material comprising a powder or pellets of a metal hydride and a phase changing material (PCM) is provided, wherein the PCM is an encapsulated phase changing material (EPCM) or matrix embedded phase changing material (MPCM) which is homogeneously dispersed within the powder or pellets of the hydride, and wherein the composite material is sequentially charged with hydrogen and discharged again. In an embodiment, hydrogen discharge takes place at a pressure between 10 kPa and 2,000 kPa. In another embodiment hydrogen charging takes place at pressure between 150 kPa and 70,000 kPa, preferably between 200 kPa and 30,000 kPa.

The invention claimed is:

1. A composite material comprising a powder or pellets of a hydride and a phase changing material (PCM), wherein the phase changing material is an encapsulated phase changing material (EPCM) which is homogeneously dispersed within the powder or pellets of the hydride, and wherein the phase changing material is in the form of particles having a diameter in a range of from 1 µm to 1 mm.

2. The composite material of claim 1, wherein the phase changing material is a microencapsulated phase changing material (MEPCM) which is homogenously dispersed within the powder or pellets of the hydride.

3. The composite material of claim 1, wherein the phase changing material is in the form of particles having a diameter in the range of from 10 µm to 20 µm.

4. The composite material of claim 1, wherein the phase changing material is selected to have a peak $T_f$ of the melting area $\Delta T$, as determined by differential scanning calorimetry (DSC), above the hydrogen desorption temperature $T_1$ at an operational desorption pressure of the hydride.

5. The composite material of claim 1, wherein the phase changing material is selected to have a peak $T_f$ of the melting area $\Delta T_f$, as determined by DSC, above the hydrogen desorption temperature $T_1$ at an operational desorption pressure and below the hydrogen absorption temperature $T_2$ at said operational desorption pressure of the hydride.

6. The composite material of claim 1, wherein the phase changing material is selected to have a peak $T_f$ of the melting area $\Delta T_f$, as determined by DSC, as close as possible to $(T_1+T_2)/2$, wherein $T_1$ is the hydrogen desorption temperature at an operational desorption pressure, and $T_2$ is the hydrogen absorption temperature at said operational desorption pressure of the hydride.

7. The composite material of claim 1, wherein a minimum amount of phase changing material in the powder or pellets of the hydride is selected according to the following equation:

$$m_{PCM}=\Delta H_r(hyd) \cdot m_{HYD}/\Delta H_m(PCM)$$

wherein $m_{PCM}$ is the minimum amount of phase changing material, $\Delta H_f(HYD)$ is the enthalpy of the hydrogen absorption reaction, $m_{hyd}$ is the stored hydrogen mass in the hydride, and $\Delta H_m$ (PCM) is the latent heat of melting of phase changing material.

8. The composite material of claim 1, which is present in the form of a compacted material.

9. The composite material of claim 1, further comprising a heat transfer enhancement agent incorporated therein.

10. The composite material of claim 9, wherein the heat transfer enhancement agent is an expanded natural graphite (ENG).

11. A hydrogen storage tank comprising the composite material of claim 1, the hydrogen storage tank being coupled to a fuel cell.

12. Method of operating a hydrogen storage system based on metal hydrides capable of releasing and absorbing hydrogen wherein the composite material according to claim 1 is sequentially charged with hydrogen and discharged again.

13. The method of claim 12, wherein hydrogen discharge takes place at a pressure between 10 kPa and 2,000 kPa.

14. The method of claim 12, wherein hydrogen charging takes place at a pressure between 150 kPa and 70,000 kPa.

\* \* \* \* \*

UNITED STATES PATENT AND TRADEMARK OFFICE
CERTIFICATE OF CORRECTION

PATENT NO. : 11,845,659 B2
APPLICATION NO. : 17/364211
DATED : December 19, 2023
INVENTOR(S) : José M. Bellosta Von Colbe et al.

Page 1 of 1

It is certified that error appears in the above-identified patent and that said Letters Patent is hereby corrected as shown below:

In the Claims

Column 8, Line 48, Claim 7, "$\Delta H_f(HYD)$" should be -- $\Delta H_r(HYD)$ --.

Signed and Sealed this
Seventeenth Day of June, 2025

Coke Morgan Stewart
*Acting Director of the United States Patent and Trademark Office*